Figure 1:
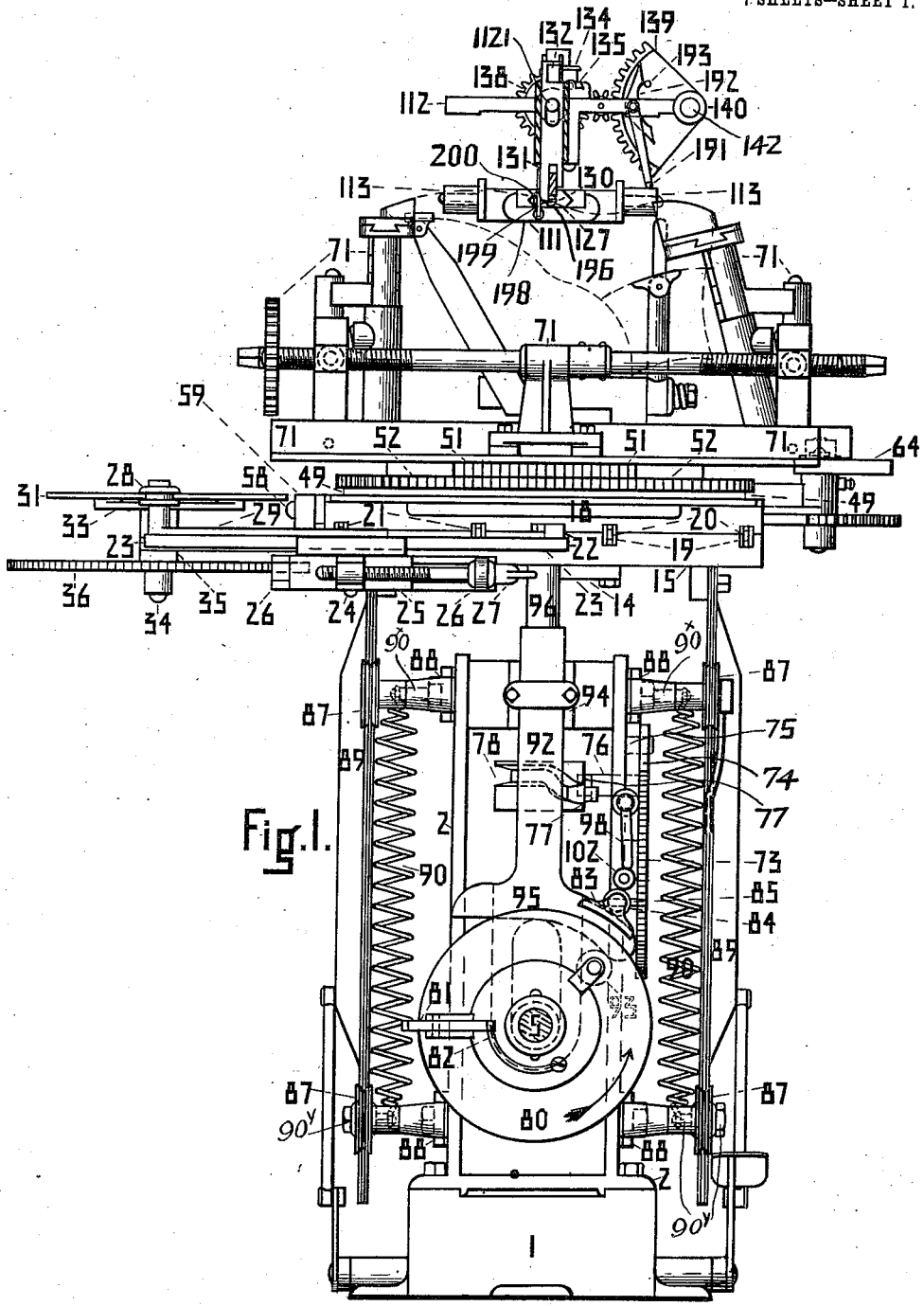

J. E. CRISP.
LASTING MACHINE.
APPLICATION FILED FEB. 8, 1899. RENEWED AUG. 24, 1910.

1,018,965.

Patented Feb. 27, 1912.
7 SHEETS—SHEET 1.

WITNESSES

INVENTOR

J. E. CRISP.
LASTING MACHINE.
APPLICATION FILED FEB. 8, 1899. RENEWED AUG. 24, 1910.

1,018,965.

Patented Feb. 27, 1912.

7 SHEETS—SHEET 3.

WITNESSES

INVENTOR

J. E. CRISP.
LASTING MACHINE.
APPLICATION FILED FEB. 8, 1899. RENEWED AUG. 24, 1910.

1,018,965.

Patented Feb. 27, 1912.
7 SHEETS—SHEET 4.

WITNESSES

INVENTOR

J. E. CRISP.
LASTING MACHINE.
APPLICATION FILED FEB. 8, 1899. RENEWED AUG. 24, 1910.
1,018,965.
Patented Feb. 27, 1912.
7 SHEETS—SHEET 5.
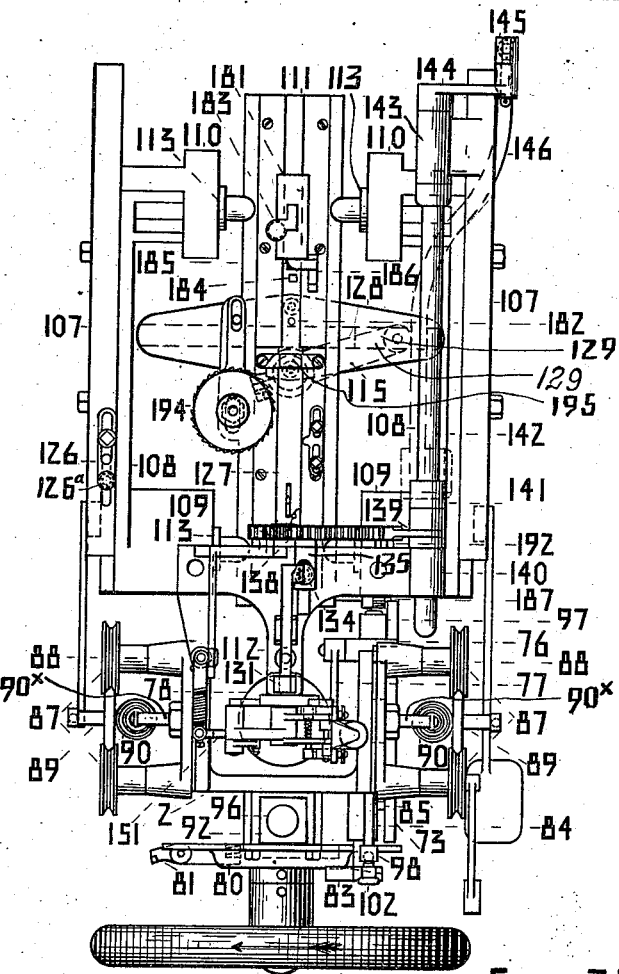
Fig. 21.
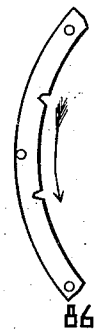
Fig. 22.
Fig. 24.    Fig. 5.    Fig. 25.
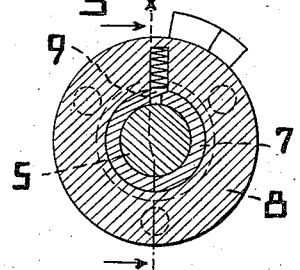
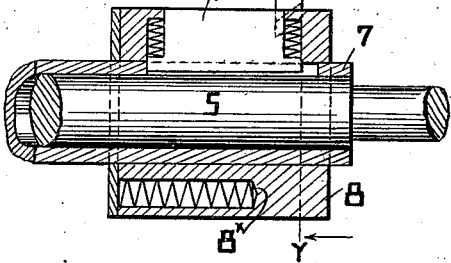
WITNESSES
INVENTOR J. E. CRISP.
LASTING MACHINE.
APPLICATION FILED FEB. 8, 1899. RENEWED AUG. 24, 1910.

1,018,965.

Patented Feb. 27, 1912.
7 SHEETS—SHEET 6.

WITNESSES
Frank G. Parker
William B. Hewitt

INVENTOR
Jos. E. Crisp

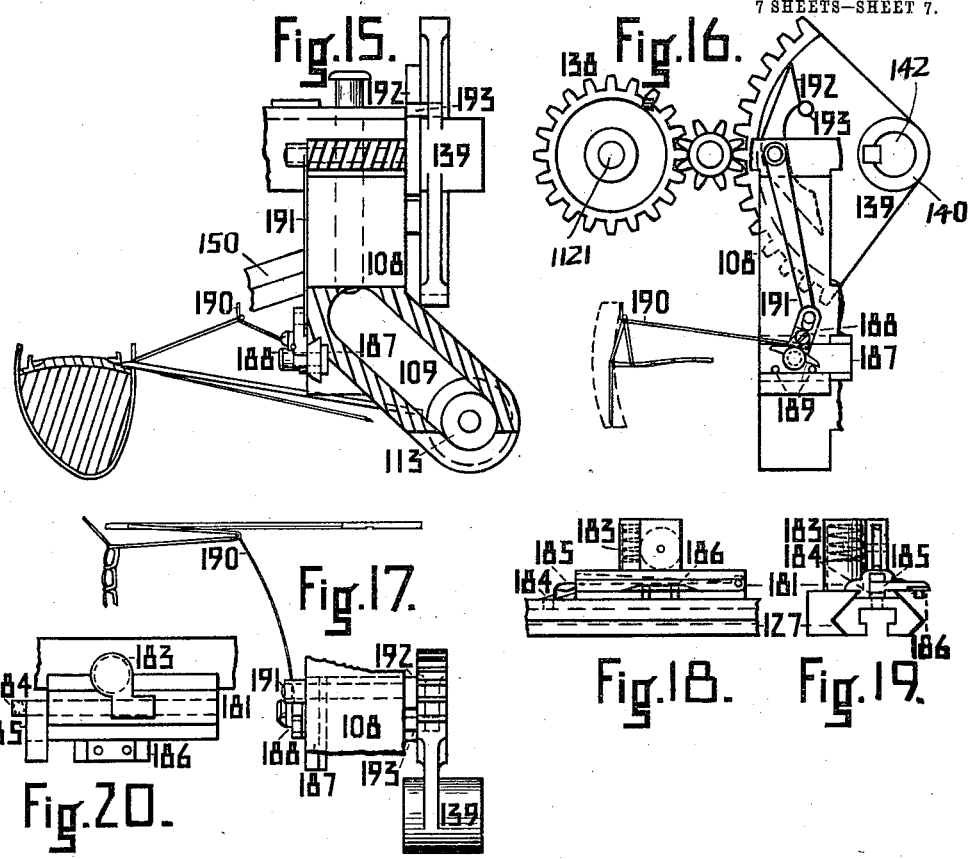

UNITED STATES PATENT OFFICE.

JOSEPH E. CRISP, OF SOMERVILLE, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,018,965.     Specification of Letters Patent.     Patented Feb. 27, 1912.

Application filed February 8, 1899, Serial No. 704,978. Renewed August 24, 1910. Serial No. 578,679.

*To all whom it may concern:*

Be it known that I, JOSEPH E. CRISP, a citizen of the United States, residing at Somerville, in the county of Middlesex and State of Massachusetts, have invented certain new and useful Improvements in Lasting-Machines, of which the following is a specification.

This invention relates to lasting machines, and more particularly to machines which secure the margin of the upper to the insole by stitches, although certain features of the invention, in their broader aspects, are applicable to a machine wherein the upper is secured to the insole by tacks.

The present invention relates to improvements in the various mechanisms illustrated and described in the applicant's co-pending application, Serial No. 531,031, filed Dec. 6, 1894.

Briefly described, the machine comprises a shoe supporting jack for presenting the shoe to the lasting devices, means for imparting a relative movement between the jack and lasting devices to transfer the point of operation of the devices around the shoe, and various auxiliary coöperating mechanism described in detail hereinafter. Preferably the relative movement, referred to, is secured by a step-by-step jack feeding mechanism.

As is well known to those skilled in the art, in lasting the toes of some shoes fewer stitches, or other fastening devices, are needed than in lasting the toes of other shoes. Similarly for the heel. In the preferred form of the present invention a stitch is normally taken for each step of the jack feeding mechanism and one object of the invention is to provide means for taking a desired, and predetermined, number of stitches at the toe or heel, or both, irrespective of the number of feed movements imparted to the shoe while such portions are being operated upon.

In accordance with this object one feature of the invention consists in means for rendering the lasting devices inoperative during a portion of the feed steps when lasting at the toe or heel. To this end means is provided for causing the lasting devices to operate concurrently with the jack feeding movements for a time, then to become inoperative for a time and then to again operate concurrently with the feed movement. Such means is preferably controlled by the machine, by means of interchangeable cams, selected and secured in place by the operator, operating at predetermined times to disconnect the connections between the lasting devices and driving shaft, and then permit such connections to again become operative.

In accordance with a further feature of the invention a jack elevating mechanism is provided which is rendered inoperative concurrently with the rendering of the lasting devices inoperative so that while the jack is making its idle feed movements it is withdrawn from a position of contact with the lasting devices.

Other features of the invention consist in means for controlling the rise and fall of the jack, in a gage and operating means therefor, to govern the rise of the jack, in an improved tool for folding down the margin of the upper upon the insole, in an improved shuttle holding device, thread guide, and thread clearer for a lock stitch mechanism, and in improved devices for easing the initial and final movements of the swinging frame on which the stitch forming mechanism is mounted.

These and other features of the invention, including certain details of construction and combinations of parts, will be further explained in the following description and pointed out in the claims.

The preferred form of the invention is best illustrated in the accompanying drawings, in which—

Figure 2:
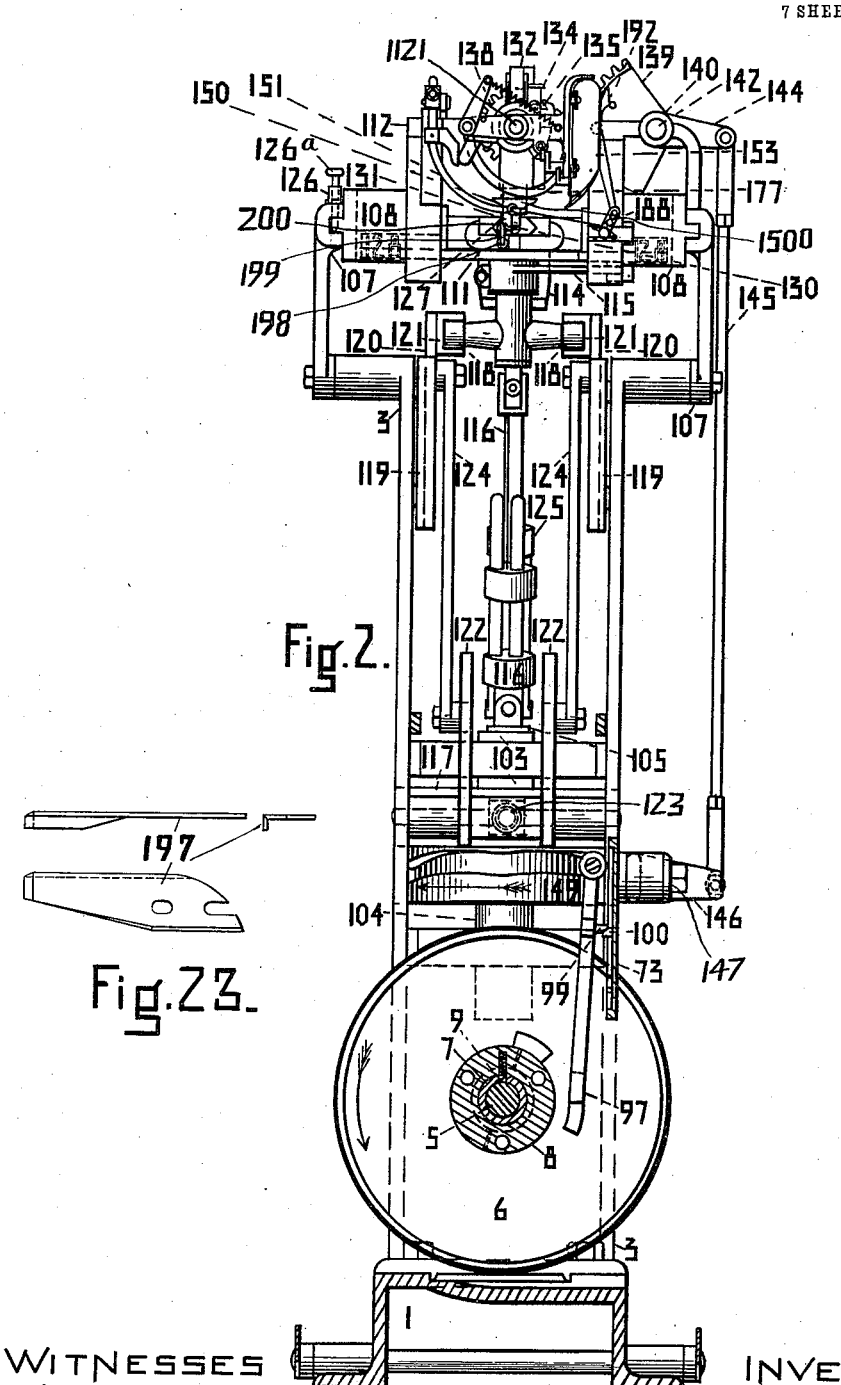
Figure 3:
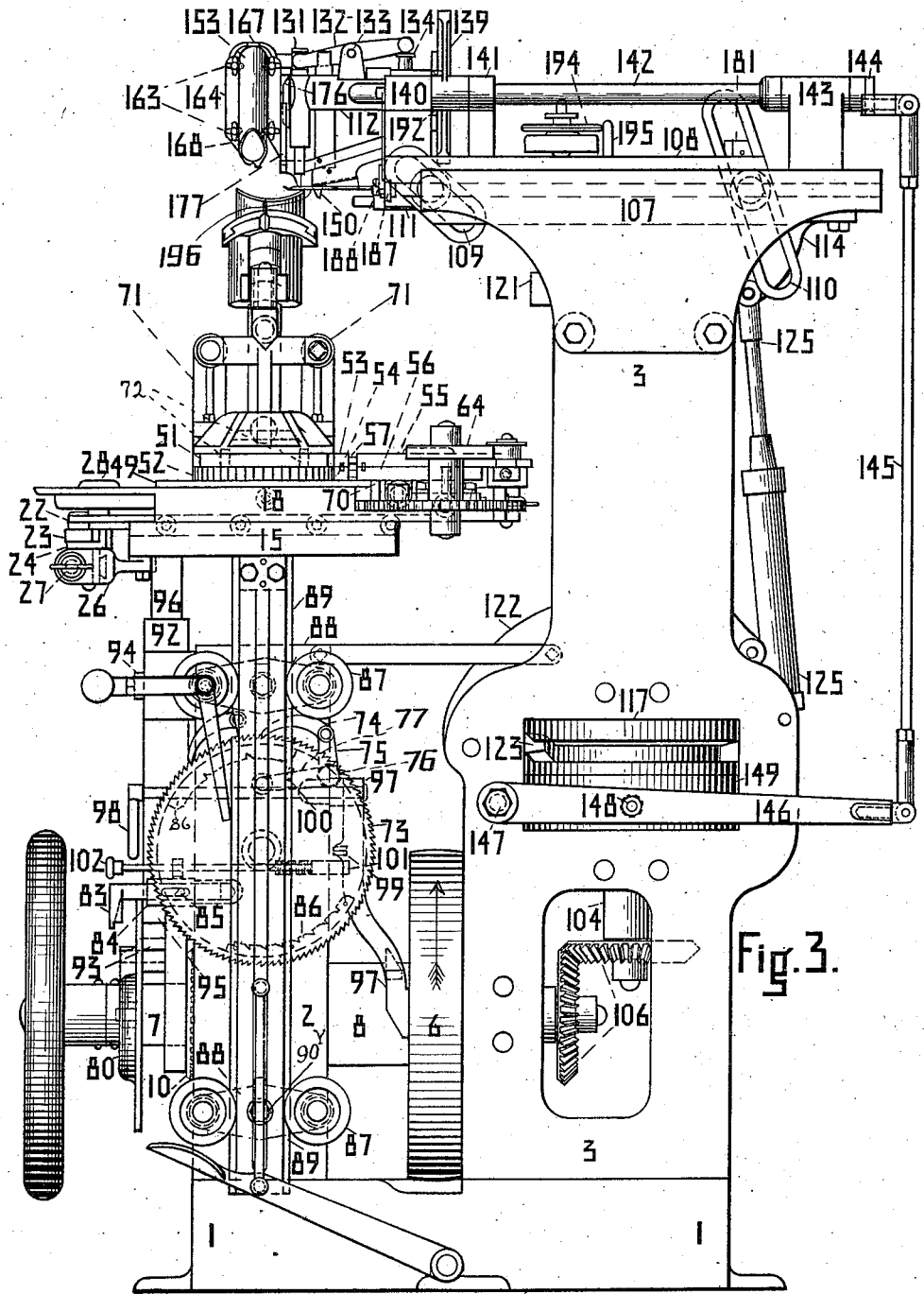
Figure 4:
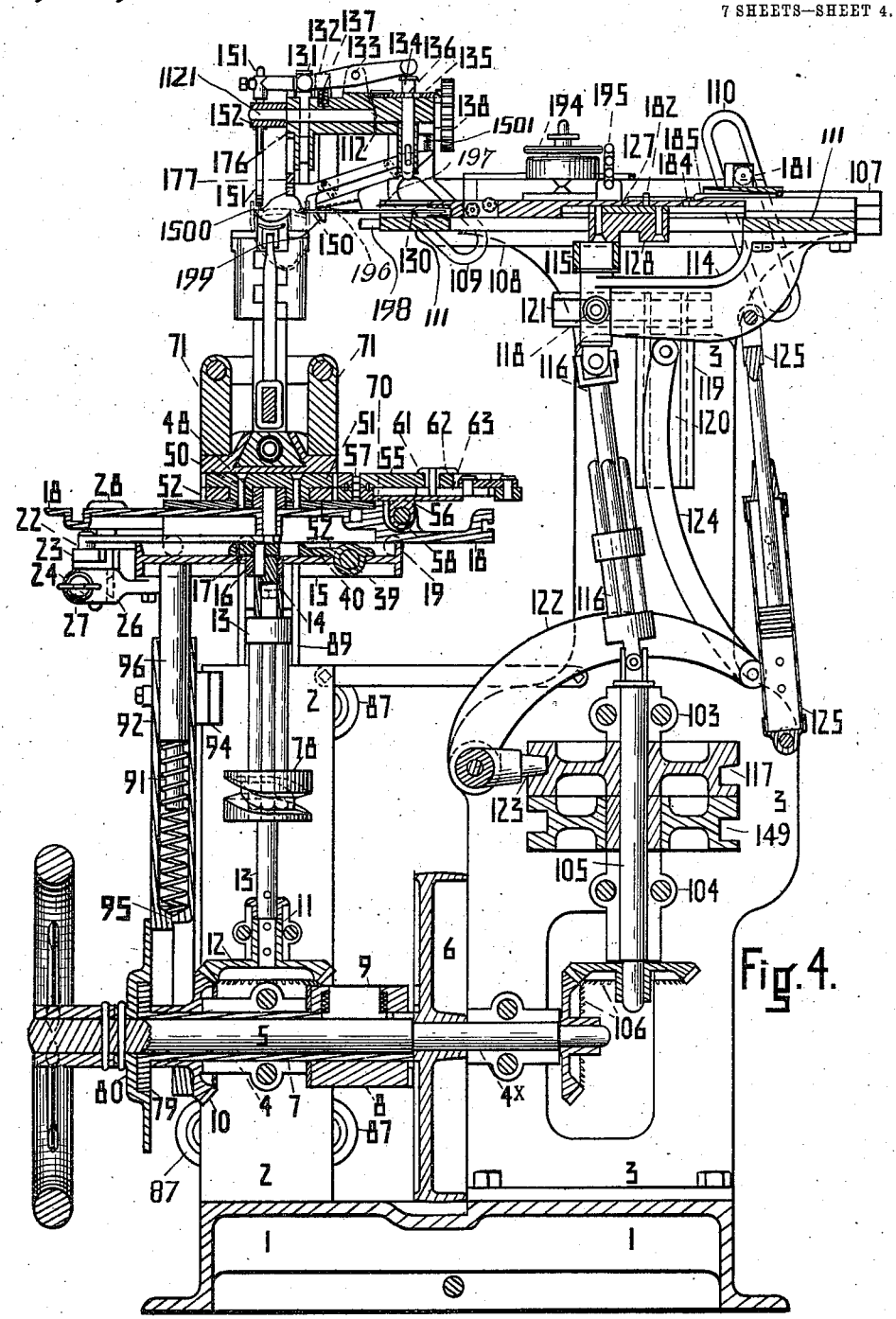
Figure 7:
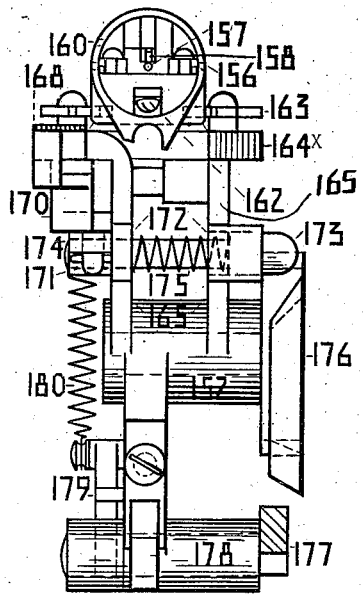
Figure 6:
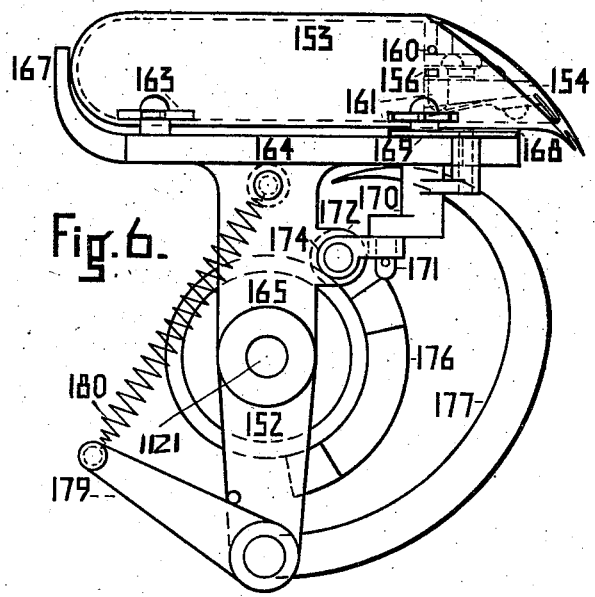
Figures 9, 14:
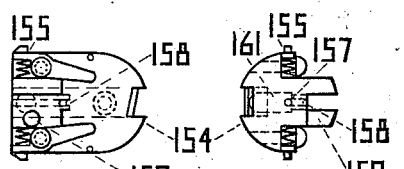
Figure 8:
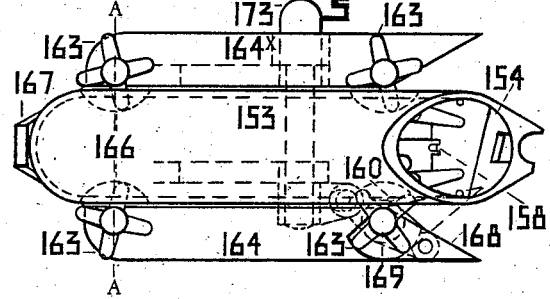
Figures 10, 11:
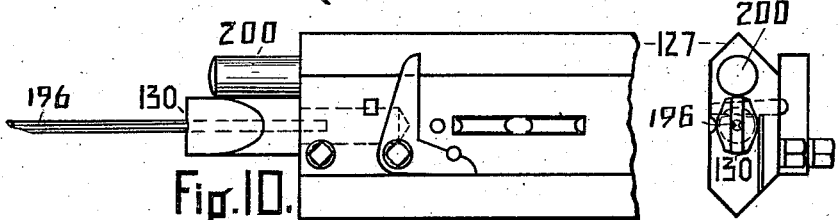
Figure 12:
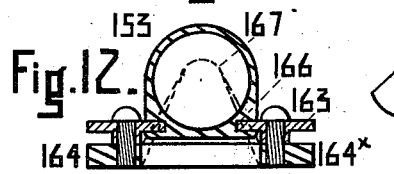
Figure 13:

Figure 1, is a front elevation showing the jack presenting mechanism, the presser foot or gage for height which operates in combination therewith, a front elevation of the swinging-frame and other details to be referred to hereinafter; also showing by dotted lines a last clamped in operative position. Fig. 2, is a front elevation of the folding-down and securing mechanism, cut away at the bottom to show the belt-pulley and clutch-shipper lever. Fig. 3, is a side elevation of the combined machine. Fig. 4, is a vertical section of the combined machine. Fig. 5, is a plan of the combined machine with the jack and its feed mechanism removed. Fig. 6, is an enlarged front elevation of the shuttle and its carrier. Fig. 7, is a side elevation of Fig. 6. Fig. 8, is a plan of Fig. 6. Fig. 9, is an enlarged plan of the removable-end of the shuttle. Fig. 10, is an enlarged plan of a portion of the needle-bar, showing the oscillating folding-down tool. Fig. 11, is an enlarged end elevation of the needle-bar and the oscillating folding-down tool. Fig. 12, is an enlarged sectional elevation of the shuttle and a portion of its carrier on line A, A, Fig. 8, looking to the rear. Fig. 13, is an enlarged plan of the swinging-end of one of the shuttle supporting bars. Fig. 14, is an enlarged inner end elevation of the removable-end of the shuttle. Fig. 15, is an enlarged side elevation of a portion of the sewing mechanism, showing the device for clearing the thread from the point of the needle. Fig. 16, is an end elevation of Fig. 15. Fig. 17, is a plan of Fig. 15. Fig. 18, is an enlarged side elevation of the take-up, a portion of the needle-bar, &c. Fig. 19, is a front elevation of Fig. 18. Fig. 20, is a plan of Fig. 18. Figs. 21 and 22, are enlarged plans of the segments which govern the movements of the clamping, folding-down and securing mechanism when the jack is swinging from side to side showing the two extremes in their construction. Fig. 23, is plan end and side elevations of the slitting and trimming knife 197. Figs. 24 and 25 are end and longitudinal sections, respectively, of the clutch 8.

Upon the base of the machine 1 there are fixed the stands 2 and 3, and formed upon or fixed to the inner sides of these stands are the bearings 4 and $4^x$, in which the main-shaft and its attachments are mounted. Figs. 1, 2, 3 and 4. A sleeve 7 is fitted to turn free on the shaft 5 and in the bearing 4 fixed to the supporting stand 2, and to the inner side of this sleeve there is fitted the sliding-clutch 8 which is moved to engage with the belt-pulley 6 by the action of springs when permitted to do so. Outside of the bearing 4 of the stand 2 a miter-gear 10 is secured to the sleeve, and its mate 12 is mounted in the bearing 11 and forms the connection to operate the jack-feeding mechanism. The lower end of the extensible-shaft 13 is fixed in the gear 12 and the upper end of this shaft is mounted in the bearing 14, secured to the table 15 of the jack-presenting mechanism. Above the bearing 14 the shaft 13 is provided with the crank 16, whose crank-pin carries the large roll 17, which operates the jack-feed mechanism ratchet and pawl movements.

The jack-feed mechanism can be adjusted for length or width, for any determined size or shape, pantographically or otherwise as desired, and it can be constructed to move in any desired lines without reference to the shape or curvature of the sides and ends of the last clamped in the jack.

The jack-feed, described in detail in the divisional part of this application Serial No. 21,959, filed June 28, 1900, consists of two trains of mechanism operating in conjunction to give the step by step movements which locate the points on the sides and ends of the last where action of the folding-down and securing mechanism is desired. One set which is numbered on the drawings from 19 to 47 provides for the transverse movement which governs the distance from the edge of the insole to the point of fastening. The other numbered from 10 to 17 and 49 to 70 provides for the longitudinal and swinging movements which space the distance between the points of fastening, all of the parts numbered from 13 to 70 being supported by and moving vertically with the jack-support when it is rising to bring the insole, on a last clamped in the jack, in contact with a gage which governs the rise with reference to the points of fastening.

The combined jack-feed mechanism moves the jack horizontally by a series of right-angular steps when moving the sides of the last (clamped in the jack) past the point of action of the folding-down and securing mechanism, and swings the jack around, from side to side, when moving the ends of the last with reference to said point. If the ends of the lasts are a true circle the movement is that of the pawl and ratchet-wheel, step by step. If the ends of the last are other than true circles, which they most always are, the movement is by a series of oblique steps which vary for each different shape of end.

The jack 71 is provided with swinging end-clamps which engage with the ends of the last, either rights or lefts, and when forced toward each other by the jack-screws, these clamps act on the ends of the last and correctly center the median line thereof with reference to the longitudinal center line of the jack-support 49. The racks 51 are fixed to the base 49 with reference to this center line, and the bottom plate of the jack is removably located upon the jack-support by the steady-pins 72 fixed in the racks 51.

When the upper, the last and the insole are completely assembled in the jack, and the last is correctly centered, as described, the upper is stretched and under tension endwise and the end-clamps of the jack have conformed the ends of the upper to the ends of the last up to the face of the insole. This leaves the edge of the upper standing at about right-angles to the face of the insole ready for the ends to be folded down and secured to the insole and the portions of the upper, between the end-clamps, ready to be drawn over, folded down and secured in the same manner.

With a last clamped in the jack, as described, and the jack in position on the steady-pins 72, each of the teeth of the racks 51, between the points limiting the turning of the jack for operation upon the toe or heel, represents one stitch of the sewing mechanism. These stitches are of varying size, as some toes do not require more than three stitches and others perhaps twelve, which is also correct for most heels. As herein shown and described 2, 3, 4, 6, 8 or 12 stitches can be automatically made as the last is swung from one side to the other. This is automatically accomplished by stopping the action of the presenting, folding-down and securing mechanisms when the pawl 54 is operating the ratchet-ends of the racks 52 to allow said pawl to move the ratchet-end 2, 3, 4, 6, 8 or 12 teeth between the reciprocations of the needle-bar; the number of teeth in the ratchet-ends being made the common multiple of these numbers. This mechanism is illustrated in Figs. 1, 2, 3, 4, 5, 21 and 22 of the drawings, and is constructed and operates as follows:—The ratchet-wheel 73 is mounted to revolve on the jack-supporting stand 2, and is provided with as many teeth as there are teeth in the ratchet-racks 52 and their semi-circular ends. The ratchet-wheel 73 is revolved, tooth by tooth, by the pawl 74 hung on the end of the swinging-lever 75 which is fixed to a suitable shaft mounted in a bearing 76, formed upon or attached to the stand 2. To the inner end of this shaft is fixed the lever 77 provided with a cam-roll which engages with the cam 78 fixed to the stationary part of the extensible-shaft 13; and each revolution of the cam 78 moves the ratchet-wheel 73 one tooth.

As shown by Fig. 4 the feeding mechanism is connected to the sleeve 7 by gears, and is operated by connecting the clutch 8 to the belt-pulley 6; and the driving shaft 5 is free to turn in the sleeve and is connected to the operating-shaft of the folding-down and securing mechanism by the gears 106. To connect or disconnect the shaft 5 and the sleeve 7 the outer end of the sleeve is provided with the disk 79 and the recessed disk 80 is fixed to the corresponding end of the shaft; the disk 79 being free to turn in the recess of 80. The latch 81 (Fig. 1) is hung to swing through a suitable slot in the disk 80 and the spring 82 acts to swing the inner end of the latch into a suitable slot in the disk 79 and lock the two disks together, to revolve in unison. The outer end of the latch 81 is extended beyond the circumference of the disk 79 and is inclined. To swing the latch 81 clear of the disk 79 and separate the sleeve and shaft, the guide rod of the curved incline 83 is fitted to slide free in a suitable bearing 84, formed upon or attached to the stand 2, and this rod, at the proper time is moved in to permit the incline to be engaged by the inclined outer end of the latch 81 and thereby swing the inner end thereof clear from the disk 79. The angular position of the incline 83 is maintained and its motion is limited by the pin 85, whose end next to the ratchet-wheel 73 is inclined on the side. To engage with the projecting inclined end of the pin 85 and to move and to hold the incline 83 in position to swing the latch 81 out of contact with the disk 79, removable-segments 86 are fixed (by steady-pins) to the inner side of the ratchet-wheel 73, one for the toe and one for the heel. Figs. 3, 21 and 22. These segments are made of such length, that if their inner edges were plain they would engage with the inclined end of the pin 85 and move in, and hold, the incline 83 in position to swing the latch 81 out of contact with the disk 79 during the whole time the jack-support is swinging from side to side and there would be no action upon the ends of the last. In the inner edges of the segments 86 there are cut as many recesses for the inclined end of the pin 85 to enter as there are sections of the last to be operated upon at the toe or heel, as shown by Figs. 21 and 22.

The normal position of the latch 81 is in the slot of the disk 79 and when the clutch is connected to the belt-pulley the shaft 5 and the sleeve 7 revolve in unison, and the inclined end of the latch 81 passes clear of the inner side of the incline 83. When the jack-support is swinging for the toe or heel and it is desired to stop the shaft and its attachments a plain part of the face of the proper segment 86 contacts with the pin 85 and moves the incline 83 in and there holds it. When the inclined end of the latch 81 contacts with the working-face of the incline 83 the spring 82 yields, the latch is swung clear of the disk 79 and the shaft 5 and its attachments stop by the time the latch has reached the highest part of the incline 83, the stress of the spring 82 serving to break the momentum of the shaft and its attachments, the only moving parts at this time are the belt-pulley 6, the sleeve 7, the clutch 8 and the jack-feed shaft and its attachments. The rest of the mechanism driven by the shaft 5 continues idle until the sleeve 7 and its attachments have made the desired number of revolutions, the ratchet-wheel 73 moving a step for each revolution, and finally bringing a recess in a segment 86 opposite the pin 85. The spring 82 is then permitted again to act to swing the latch 81 into the slot in the disk 79, at the same time moving the pin 85 into the recess. The shaft and sleeve then revolve in unison until it is again desired to stop the shaft or the swinging movement of the jack-support is finished when the pin 85 remains in until engaged by the other segment 86.

The vertical rise of the jack-support is alined by the grooved guide-rolls 87 mounted in pairs on the stands 88, which are secured to the stand 2 by bolts centrally located between the pairs of guide-rolls. The stands 88 can be swung on the central bolts to adjust the bearings of the grooved guide-rolls on the guide-bars 89 and at the same time keep said bars in line with the jack-feed shaft 13. The ribbed guide-bars 89 move vertically between the pairs of guide-rolls and are secured to the table, as shown in Figs. 1 and 3.

The jack-support, its attachments and a gage to be described hereinafter constitute the mechanism which presents the last with the upper and insole assembled thereon, in accurate vertical alinement to the point of action of the folding-down and securing mechanisms, when said parts are raised by the elastic elevating mechanism which comprises the balance-springs 90 (Figs. 1 and 5) and the auxiliary-spring 91 (Fig. 4). The balance-springs 90 are secured at their upper ends to the studs 90$^x$ projecting from the bolts holding the upper guide-roll stands, and at their lower ends to studs 90$^y$ adjustably fixed in slots in the lower ends of the guide-bars 89, Figs. 1 and 3. The springs 90 are adjusted to hold the jack-support and its attachments partially elevated and bring the face of the insole (on the highest curves of the last bottom) near to the contacting end of the gage for height when said gage is elevated. When held in this manner the jack-support and its attachments are susceptible to the slightest vertical impulse.

The final rise of the jack-support and its attachments is given by the action of the auxiliary-spring 91 (Fig. 4) mounted in the socket-slide 92, which is raised by the roll 93 (Figs. 1 and 3) mounted on and revolving with the disk 80. The upper end of the socket-slide reciprocates in the bearing 94, formed upon or attached to the inner sides of the stand 2 (for which it forms a tie). The lower end of the socket-slide is slotted to pass over the sleeve 7 and is provided with a lower face 95 upon which the roll 93 acts to raise it at the proper times. Above the auxiliary-spring 91 in the socket-slide 92 there is the plunger 96 with contacts with the under side of the table 15 and transmits the elastic action to the spring to give the final rise of the jack-support, once for each reciprocation of the folding-down and securing mechanism, as long as the latch 81 is in engagement with the disk 79.

Mounted on part of the folding-down and securing mechanism, as near as possible to its point of action, there is a reciprocating gage 131 (Figs. 1 to 5), which is operated at the proper times by said mechanism, as hereinafter described. This gage is locked down to oppose the thrust of the spring 91 and govern the vertical position of the last in the jack by contact with the face of the insole. It also forms the upper member of the clamp which holds the work for the operation of the folding down and securing mechanism. When the jack-support and its attachments are raised by the action of the auxiliary-spring 91 to bring the face of the insole in contact with the gage 131 they form the lower member of the holding clamp, and when the spring 91 has reached its limit of action the table 15, the jack-support, the jack, the last and the insole are rigidly clamped between the opposing ends of the gage 131 and the plunger 96 for any desired action upon the work clamped in the jack. The auxiliary-spring 91 always brings the face of the sole into intimate contact with the working end of the gage 131 with requisite force, and at the same time is capable of sufficient vertical variation to automatically provide for the variations of thickness of soles and height of lasts.

The shipper-lever 97 (Figs. 2, 3 and 5) swings on a shaft mounted in a bearing formed upon one of the sides of the stand 2, and is provided with the handle 98 (Figs. 1 and 3) to swing it toward the clutch 8 and stop the machine at any time. Figs. 1, 2 and 3. The shipper-lever is also provided with an inclined projection 99 (Fig. 2) which is engaged by a similar projection 100 fixed on the ratchet-wheel 73 and automatically stops the machine after each full revolution of the jack-support. To prevent the shipper-lever 97 from swinging out of contact with the incline of the clutch 8 and allowing the machine to start when not desired the sliding spring-operated catch 101 (Fig. 3) is fitted to slide in bearings on the side of the stand 2, and when the shipper-lever is swung into position to engage with the incline of the clutch the inclined end of the catch passes over the edge of the shipper-lever and holds it as desired. To the outer end of the catch 101 there is fixed the pull-button 102 for drawing the inclined end of the catch away from the shipper-lever and permitting the machine to start.

The stand 3 supports the folding-down and securing mechanism and between the inner sides of this stand are secured the bearings 103 and 104 in which the cam-shaft 105, is rotated by the miter-gears 106 connecting it with the main driving-shaft 5. Horizontal guide-ways 107 are formed upon or attached to the upper ends of the stand 3. These guide-ways support the sliding-frame 108 provided with the inclined-slots 109 and 110 (Figs. 3 and 5) in which the swinging-frame 111 (Fig. 5) carrying the folding-down and securing mechanism is mounted.

The shuttle-stand 112 is fixed upon the inner ends of and unites the two sides of the sliding-frame 108. This stand supports the shuttle-shaft, the gage for height, the upper-holding pincers, the looper and their attachments. The swinging-frame 111 supports the needle-bar and its attachments, and when operated by the cam 117 (Figs. 3 and 4) swings them in a vertical plane about twenty degrees each side of the horizontal line of the sliding-frame 108. When the point of the needle 196 is first in contact with the work, the needle is inclined downward, and when the folding-down tool (in which the needle is mounted) is operating the inclination of the needle is upward. The swinging-frame 111 is provided with the flanged-rolls 113 (Figs. 3 and 5) which engage with the slots 109 and 110 and reciprocate therein when the frame swings. These slots guide the movement of the swinging-frame in a vertical plane and in substantially an arc whose center is located at the place where the point of the machine needle first contacts with the work. A stand 114 (Fig. 4) is fixed to the rear end of the swinging-frame and a crank-shaft supporting the crank 115 is mounted in the outer end thereof. The crank-shaft is connected to the cam-shaft 105 by the extensible-shaft 116 provided with universal joints at its ends, which provide for all movements of the sliding and swinging-frames.

The swinging-frame is operated by the cam 117 and the following connecting mechanism. Formed upon the sides of the bearing for the crank 115 are projecting bosses at the ends of which are mounted the flanged-rolls 118 (Figs. 2 and 4). Fitted to slide in vertical guide-ways 119 fixed on the inner sides of the stand 3 are the slides 120 carrying at their upper ends the horizontal grooved-guides 121 to which are fitted the flanged rolls 118. Pivoted to the inner sides of the stand 3 are the swinging-levers 122 having a common hub which carries, on a suitable projection, the cam-roll 123 connecting them to the cam 117. The outer ends of the levers are connected to the slides 120 by the curved links 124 which complete the connection. The links 124 are made elastic curving them sufficiently to yield a little when the cam 117 is starting the swinging-frame 111 in either direction. This eases the first movement of the swinging frame. To ease the final movement of the swinging-frame 111 an air cushion cylinder 125 is pivotally attached to the stand 3 (as shown by Fig. 4). This air cushion aids in absorbing the momentum of said frame as it drops downward.

The sliding-frame 108 and its attachments are locked in any desired position on the guide-ways 107 by a sliding-pin mounted in the stand 126 which is adjustably fixed on one of the guide-ways. Figs. 2 and 5. This stand comprises a thin plate which is slotted to provide for its movement longitudinally with reference to a suitable clamping-bolt tapped into the guide-way. The stand is provided with a projecting boss which forms a bearing for the sliding-pin 126$^a$, said pin passing through the boss, a suitable slot in the guide-way and entering a hole formed for its reception in the guide of the sliding-frame, as shown by Fig. 2. The folding-down and securing mechanism is mounted on the swinging and sliding frames, and when the pin 126$^a$ is withdrawn, the whole combination can be moved back from over the point of operation for any desired purpose and the set position of the adjustable-stand 126 with the pin 126$^a$ engaging with the sliding-frame fixes the distance from the center of the insole to the points of fastening the upper thereto.

The needle-bar 127 (Figs. 1 and 4) reciprocates in a guide-way formed upon or attached to the swinging-frame 111 and has the crank-block slide-way 128 adjustably fixed to its under side. The crank 115 is adjustably fixed to the crank-shaft and has pivoted to its outer end the sliding-block 129 (Fig. 5), which engages with the groove of the slide 128 and reciprocates the needle-bar when the crank is revolved. The needle-bar 127 has mounted in its outer end the oscillating folding-down tool 130 which at the termination of the forward movement of the needle-bar presses a section of the upper close to the face of the insole, and at the same time by contact with the upper oscillates to conform its working-face to the curve of the face of the insole at the point operated upon. Figs. 10 and 11.

As shown by the enlarged Figs. 10 and 11 the folding-down tool is pivoted on the longitudinal center line of the needle-bar to oscillate transversely thereto, and it is retained in position and the oscillation is limited by a suitable cross-pin passing through the needle-bar in the usual manner.

As shown by Fig. 11 the working end of the folding-down tool is about the same thickness as the diameter of the shank of the machine-needle 196, the edges being slightly rounded and the shank of the needle 196 is fixed centrally with the center of the pivot. The working-face of the folding-down tool is made about as wide as the distance of the longest feed of the work, and its change of angle from section to section is but little. As the needle is fixed in the center of the axis of the pivot it oscillates therewith and this oscillation brings the point of the needle substantially correct to the angle of the next section of the insole presented for penetration; a valuable consideration, especially when operating upon insoles which are mechanically indented at the point where it is desired that the point of the machine needle should enter.

In the slot in the needle bar shown in Fig. 11 and over the folding down tool, the slitting and trimming knife 127 (Fig. 23), having a chisel-like cutting edge of L-shape, is adjustably fixed. The clamping screw, shown at the forward end of the needle bar in Fig. 10, secures the knife in operative position. This knife reciprocates with the needle bar and the cutting is done near the termination of the forward movement of the needle bar, a little before the time of action of the folding down tool. The horizontal cutting edge of the knife is a little wider than the length of the machine feed and operates to trim any excess on the edge of the upper above the needle. The short vertical edge projects downward and operates to slit the margin of the upper nearly to the face of the insole to permit the sections thus made to be fairly turned down on the insole without deflecting the succeeding portion of the margin of the upper.

The gage 131 for height is fitted to reciprocate vertically a limited distance in a slide-way formed in the outer end of the shuttle-stand. It is slotted to pass over the shuttle-shaft, and also slotted to guide the swinging-end of the upper-holding pincers, as shown by Fig. 1. The operating end of the gage for height is located as near as possible to the path of the machine-needle and to the place where the point of the needle first contacts with the work. The upper end of the gage 131 is formed into a bearing which is engaged by one end of the oscillating-lever 132 (Figs. 4 and 5), pivoted at 133 to a projection formed upon or attached to the shuttle-stand. The opposite end of the lever 132 is elevated at the proper times, by the plunger 134 which is mounted to slide vertically in the rear part of the shuttle-stand, over the forward end and right side of the swinging-frame. The needle-bar guide-way of the swinging-frame at the termination of its upward rise, engages and elevates the plunger 134 which through the lever 132 depresses the gage for height to operative position.

To hold the gage for height in operative position the spring-operated catch 135 (Figs. 1 and 4) is fitted to slide in a bearing formed on the top of the shuttle-stand and to enter a recess 136 formed on the plunger 134, when said plunger has reached its full elevation, and lock it there. The end of the sliding catch 135 is extended over the rear end of the shuttle-stand and is inclined, so that a suitable inclined-pin fixed in the gear operating the shuttle will push the catch 135 back and allow the plunger 134 to drop and the gage for height to be raised by the action of the spring 137, just before the cutting-edge of the knife 197 contacts with the edge of the upper.

The shuttle-shaft 1121 (Fig. 4) is mounted in a suitable bearing formed in the shuttle-stand and is operated by the gear 138 fixed to its inner end. The gear 138 is oscillated by the segmental-gear 139 and an intermediate gear (see Fig. 16). The hub of the segment 139 is held endwise between the bearing 140 (Fig. 3) formed on part of the shuttle-stand and the bearing 141 formed upon or attached to the sliding-frame 108 and it, therefore, moves with the sliding-frame. The hub of the segment 139 is fitted to slide on and oscillate with the rocker-shaft 142, and this shaft is fitted to turn but not to slide, in the bearing 143 formed upon the horizontal guide-way 107. Outside the bearing 143 there is fitted on the rocker-shaft a rocker-arm 144 (Figs. 2 and 3) which is connected by a link 145 having universal joints at each end to the cam lever 146 pivoted to the stand 3 at 147. The cam lever 146 is provided with a cam-roll 148 which engages with the shuttle-cam 149 adjustably secured to the cam 117 for operating the swinging-frame 111.

Under the shuttle-stand, near its rear end and central therewith, the swinging-upper-holding pincers 150 are pivoted, as shown by Fig. 4. Their functions are, first, to hold the edge of the upper, or upper and welt, for the point of the machine-needle to penetrate, at the same time guiding the point of the needle to its work, and second, to hold the same for the action of the knife 197 as it is moved forward by the needle-bar. These pincers, as described in the co-pending application Serial No. 531,031, hereinbefore referred to, are held open by suitable spring and are operated for the first movement by the spring-operated plunger 198 (Figs. 1 and 4) mounted in the forward end of the swinging-frame which as said frame is moving to give the machine-needle its downward inclination, comes in contact with the downward projection 199 on the swinging member of the pincers and causes the two members to grasp the edge of the upper. This grasp is maintained until the point of the machine-needle passes through the upper, when the swinging of the frame to change the inclination of the needle withdraws the plunger 198 and allows the pincers to open. The second movement is made by the spring-operated plunger 200 mounted in the forward end of the needle-bar, as shown by Figs. 10 and 11, which engages with the downward projection 199 by the forward movement of the needle-bar and causes the pincers again to grasp the edge of the upper for the action of the knife 197, the pincers opening by the action of their spring on the backward movement of the needle-bar.

The looper 151 (Figs. 2 and 4) engages with the needle-thread central with the point of the shuttle and forms, and holds open a loop of said thread until the center of the shuttle has passed through it, this looper is operated by a cam fixed in the gear 138 and suitable connecting mechanism (see Fig. 5) all as described and claimed in the co-pending application Serial No. 531,031, hereinbefore referred to.

The hub of the shuttle-carrier, see Fig. 6, is fixed to the outer end of the shuttle-shaft 1121, and on arms radiating from it are mounted the shuttle 153 and a spring-operated cam 177 which governs the vertical movements of the holding-pincers 150. The shuttle is designed to carry a cop of thread which is drawn from the center thereof as it passes out of the shuttle. The front end of the shuttle is beveled to the upward inclination of the machine-needle, and is extended a little beyond the line of its back to form a hook to pick up the looper thread; the point of the shuttle and the point of the looper being located close to the opposite sides of the needle, at the time the looper is commencing to rise. The shuttle 153 is a hollow shell, as shown by Fig. 12 and is provided with the removable-end 154 (Fig. 9) through the center of which the thread is taken from the center of the cop. The removable-end of the shuttle 154 is held in operative position on the shell by the spring-operated catches 155 which enter the slots 156 (Fig. 6) in the shell. The shuttle-thread is taken from the center of the cop through the hole 157 (Figs. 7 and 14) in the center of the end of the shuttle and thence back around the post 159 to pass out of the shuttle through the hole 160 (Fig. 6). A spring-operated tension device 161 is mounted in the removable-end of the shuttle and adjusted by the screw 162 as desired.

The shuttle 153 is connected to the hub of the shuttle carrier by the revolving-spiders 163 (Figs. 6, 7, 8 and 12) which are pivoted to revolve on the bars 164 and 164$^x$, the bars being connected to the hub of the shuttle carrier by the arms 165. The arms of the spiders 163 are fitted to engage in the recesses 166 cut in the sides of the shuttle next to the bars 164 and 164$^x$, these recesses being made long enough to always engage with one or more of the arms of the spiders. The rear ends of the bars 164 and 164$^x$ are connected by the curved end 167 (Figs. 6 and 8) which acts as an abutment and positions the shuttle with reference to the centers of the spiders against the friction of the needle-thread as it passes around the shuttle. The arms of the spiders and all parts of the shuttle contacting with the needle-thread are rounded and polished, and the needle-thread passes over the shuttle inside of the bars 164 and 164$^x$, revolving the spiders 163 by contact with their arms, as it passes them, and then moves clear of the back end of the shuttle, moving it slightly forward as the thread passes it. The spiders 163 are so light that the needle-thread leaves their arms correct for the next passing of the thread, the friction of the sides of the recesses 166 being enough to prevent free revolution. When the stitch is to be set the best position for the shuttle-thread is on the outside of the bar 164 at the time the shuttle is at the extreme limit of its backward movement.

To positively throw the shuttle-thread outside of the bar 164 said bar is provided with the swinging-end 168, Figs. 8 and 13 which changes its inclination automatically at the proper times. This swinging-end 168 is made of thin metal and is pivoted at 169 under the spider at the front end of the bar 164. Pivoted under the bar 164, on a prolongation of the pivot-pin of the spider located there, there is the oscillating bell-crank lever 170, one end of which is connected to the swinging-end 168 by a suitable pin and the other end is provided with the pin 171. On the arms 165 are formed the bearings 172, of two different diameters, and the pin 173 is mounted to slide therein. To the small part of the pin 173 there is fixed the apertured-block 174 which engages with the projecting-pin 171 of the oscillating-lever 170 and completes the connection. Around the small part of the pin 173 between the bearings 172 there is placed the spiral-spring 175 which acts to push the large part of the pin toward the shuttle-stand and hold the swinging-end 168 in the position shown by the full lines of Fig. 8. Fixed on the end of the shuttle-stand there is the stationary-cam 176 and when the large part of the pin 173 is brought in contact with the elevated face of this cam (as the shuttle is oscillated) the swinging-end is swung into the position shown by the dotted lines of Fig. 8, and as the shuttle swings back the needle-thread is guided outside of the bar 164. The swinging-end 168 when in the first described position also serves to guide the shuttle-thread between the bar 164 and the sides of the shuttle, and the end of the bar 164$^x$ is given a reverse inclination for the same purpose.

The cam 177 which governs the movement of the upper holding-pincers with reference to the face of the insole is mounted to swing in a bearing formed at the end of an arm projecting from the hub of the shuttle-carrier, and fixed to the outer end of the cam-spindle in the lever 179, Figs. 6 and 7, which limits the swing of the cam by contact with a stop-pin fixed in the supporting arm. A strong spiral-spring 180 acts to hold the lever against the stop-pin. The face of the cam 177 contacts with a projection 1500 (Figs. 2 and 4) formed upon or attached to the outer end of the holding-pincers as shown by Fig. 4, and it acts thereon with a yielding pressure as the shuttle is oscillated. The spring 1501 shown at the inner end of the pincers, in Fig. 4, act to cause the outer end of the pincers to maintain contact with the face of the cam 177 at all times, and the spring 180 yields when the jaws of the pincers contact with the face of the insole.

The take-up 181 (Figs. 4, 5, and 16 to 20) reciprocates in a guide-way over the needle-bar 127. It is moved in one direction by the thread, as the needle moves toward the work, and in the other direction by the pin 182 (Fig. 4) fixed in the needle-bar. To prevent the needle-thread from over-hauling too fast, when the needle-bar is moving toward the work, the take-up is provided with a friction device which acts against the face of the guide-way of the take-up. This device consists of the pocket 183 fixed on the take-up carrying a friction-block next to the face of the take-up and provided with a spring over the block to press it toward said face.

When the eye of the machine-needle is drawn back out of the work the needle-thread at the back of the needle should be drawn taut by the take-up, to prevent the formation of a loop which would draw hard from the insole and the edge of the upper. This is done by giving the take-up a preliminary movement to draw the under part of the needle-thread taut as the eye of the needle is drawn back through the insole and the edge of the upper, and then stop said movement and allow the thread to be slack until the stitch is to be set. To make this preliminary movement of the take-up the catch 184 Figs. 4, 5, 19 and 20 is properly located upon the needle-bar and the latch 185 is hung to swing in the under side of the take-up. When the needle-bar moves back the catch engages with the end of the latch and moves the take-up back as long as the latch remains down. The free end of the latch is extended over the face of the take-up guide-way and fixed to said face is the inclined-step 186 which engages with the extension of the latch and swings it up. This permits the catch to pass under the take-up and leave it at rest until the pin 182, by the continued movement of the needle-bar contacts with the latch and sets the stitch.

When the needle-thread is drawn taut at the termination of the backward movement of the needle-bar the thread is liable to rest on the point of the machine-needle, and when the needle-bar next moves toward the work to be thus carried until the point of the needle strikes the work. In this case the point of the needle would cut some of the strands of the needle-thread, or pass between them. To clear the needle-thread from the point of the needle, a thread clearer, comprising a light wire-hook is operated as follows. Figs. 15, 16 and 17. A slide 187 is fitted to slide transversely in the end of the sliding-frame 108 under the shuttle-stand, and is provided with a spring-operated plate which will prevent free movement of the slide. On the slide 187 there is mounted the free swinging-lever 188 whose movement is limited by the pins 189, and adjustably fixed to the lever is the elastic wire-hook 190. The lever 188 is operated by the lever 191 which is mounted to swing on a part of the shuttle-stand, and to the inner end of the lever-spindle is fixed the cam 192 which is oscillated by the pin 193 fixed in the segment-gear 139. As the segment oscillates the hook swings as indicated by the curved dotted lines of Fig. 16 until the pins 189 stop the swing in either direction, when the slide 187 moves and carries the hook in the straight dotted lines connecting the ends of said curved dotted lines. The hook or thread clearer 190 engages with the needle-thread as the needle commences to move toward the work and moves the thread clear of the path of the point of the needle until the point of the needle has penetrated the work. At this time the thread is held back in the form of a loop with one end at the eye of the needle and the other end at the last drawn stitch. As the needle further advances the long straight part of the hook 190 acts as a torsional-spring and allows the short member to twist forward and release the loop of the needle-thread, to pass into the work (see Fig. 17). When the hook is clear of the needle-thread it drops down to allow the needle-bar to pass over it, and when the needle-bar moves back the hook again rises, then falls and moves to the other side of the path of the needle, to again rise at the proper time and carry another portion of the needle-thread clear of the path of the point of the needle, when it again advances.

The needle-thread tension device 194 (Figs. 3, 4 and 5) is mounted on a stud adjustably fixed on the swinging-frame and it can be set to give any desired number of light stitches on the first sewn side of the upper and then it will automatically change to make the remainder of the stitches with greater tension. This device is described and claimed in application Serial No. 531,031, hereinbefore referred to.

The thread-guide 195 is fixed to the top of the swinging-frame and it leads the thread from the spool to the tension device, from the tension to the take-up and from the take-up to the thread-guide rolls which lead the thread to the back of the needle.

The process of lasting commences with jacking and positioning the last with the upper and insole properly tempered thereon, the end-clamps of the jack perfectly conform the ends of the upper to the ends of the last and insole, up to the face of the insole, and there firmly clamp it, with the median line of the upper held under end tension, and the edge of the upper about vertical. The jacking of a last may be done with the jack removed from the jack-support during the time the machine is operating upon a last fixed in another jack; the jack being removably located upon the jack-support and only rigidly clamped in the machine during the time the machine-needle is advancing. The automatic stop of the machine is made as the inner side of the last is moving past the line of action of the folding-down and securing mechanism, from the heel toward the toe a little beyond the ends of the counter, which is the point of starting the next last. With the sewing mechanism properly threaded and the tension-device set for the desired number of light stitches when the holding-down catch is released the balance-springs raise the jack-support and its attachments to the holding-pincers, the upturned edge of the upper entering them at the same part of the last where the last operation was finished. With the edge of the upper in the holding-pincers and a slit cut in it, in the proper location, the pull-button 102 may be drawn out and the machine operated by power. As the main shaft commences to revolve, the swinging-frame commences to move up and the needle-bar therein to move forward, the shuttle to move down and the needle-thread spreader to move up and across the path of the needle, carrying the needle-thread clear of the point of the needle. As the needle advances toward the work the gage for height moves down and is locked, the socket-slide moves the auxiliary-spring up, firmly clamping the jack in position, and the jaws of the holding-pincers are closed upon the edge of the upper; the grooves in their ends guiding the point of the needle to the upper and insole. By the time the swinging-frame has reached its greatest elevation and commenced to move down the point of the needle has passed through the upper and entered the insole, and by the time the swinging-frame is horizontal the point of the needle has penetrated the insole about one-eighth of an inch and when the swinging-frame is fully depressed the point of the needle is commencing to pass out of the face of the insole, and the first grasp of the holding-pincers is released. If the stitch being made is any other than the first the needle-thread is now held by the hook 190 in the form of a loop, and as the needle-bar further advances the hook swings and the loop is released to move into the work. As the needle-bar further advances the holding-pincers again grasps the edge of the upper for the action of the slitting and trimming-knife, and as the edge of said knife contacts with the upper, the gage for height is unlocked and the knife and the folding-down tool move under said gage, and at the termination of the forward movement of the needle-bar a section of the upper is trimmed and pressed close to the face of the insole. When the needle-bar commences to move back from the work, the extreme stress of the auxiliary-spring is removed until it will just balance the jack-support and its attachments without deflecting the machine-needle downward, which would prevent the looper and the shuttle from picking up the needle-thread when the loop rises. As the needle-bar moves back the holding-pincers are released, the loop rises and at the proper time the looper and the shuttle engage with it; as the shuttle moves forward the looper raises the loop over the center of the shuttle and the two sides of the loop pass between the sides of the shuttle and the bars 164, 164$^x$, until they meet the arms of the front pair of the spiders 163, which they contact with and revolve, moving one pair of arms clear of the recesses 166, and leaving another pair of arms in said recesses, the second pair of arms entering the recesses before the first pair passes out. This maintains the position of the shuttle perfectly in all positions of the spiders. As the movement of the shuttle continues the needle-thread contacts with the pair of spiders at the rear end of the shuttle and passes them as it did the first pair; the point of the looper disengaging from the needle-thread as these spiders are passed. At this time the eye of the needle is about under the outer side of the shuttle and as the needle moves back the action of the take-up which has commenced its preliminary movement and the continued movement of the needle-bar, draws the loop of needle-thread clear of the back end of the shuttle; the shuttle moving a little forward by the action of the needle-thread, and the arms of the spiders limiting the extent of this movement by contact with the recesses 166. The shuttle then commences to move back and the preliminary movement of the take-up continues and straightens out the thread at the back of the needle, by the time its eye is in contact with the inner side of the insole, and the point of the needle is drawn out of the work. The auxiliary-spring is fully lowered, the feed movement commences, the preliminary movement of the take-up finishes, the pin 182 commences the final movement of the take-up, the feed movement finishes and the stitch is set, with the needle-bar fully back and the swinging-frame still at the extreme limit of its downward movement.

During the time the needle-bar and its attachments are moving as described, the shuttle has been moving back, the end of the slide 173 has contacted with the stationary-cam 176 and moved the swinging end of the bar 164 under the shuttle to guide the shuttle-thread over the front of said bar, which is done, and the shuttle reaches the extreme limit of its backward movement a little in advance of the time the needle-bar does so, in order to draw the shuttle-thread taut before the final pull of the needle-thread across it in setting the stitch. The object of having the shuttle-thread taut before the final pull of the needle-thread is to use the least possible quantity of shuttle-thread consistent with good work. When the shuttle is fully back the hook 190 has dropped down and moved to the side of the needle from which it started, ready to move up and draw another portion of the needle-thread clear of the path of the point of the needle when it again advances.

The operation of slitting, trimming, and drawing sections of the edge of the upper close to the face of the insole continues under light tension until the feed has moved the last in the jack, in a straight line, to the point where the turn for the toe commences. The greater tension then automatically commences to act and continues until the upper is fully united to the insole. After lasting the toe, the true side-lasting process commences, the first sewn side of the upper having only been held in position with reference to the strain to be brought upon the second sewn side. Each stitch as it is drawn acts upon a small band-like section of the upper, which is secured to the opposite side of the insole, and draws this section close around the last, at the same time drawing the next section well up. The next stitch draws the next section in the same manner at the same time gaining a little stock if there is any slack, of the upper, around the last between the toe and heel. After the heel is lasted the jack-support is fully swung around and the straight journey toward the toe commenced, after a few stitches have been made the machine is automatically stopped. The operator moves the table 15 down against the action of the balance-springs until it locks. This allows the last to be unjacked and replaced by another, or the jack to be removed and replaced by a jack having a jacked last therein ready for the machine operation.

By the term "lasting devices" as used in the appended claims, it should be understood that any devices for lasting the upper are meant irrespective of the form of fastener for securing the upper to the insole. Also, unless otherwise designated in the claims, "lasting devices" should be interpreted as including all the necessary mechanisms to work an upper over a last and secure it in place.

It will be clear to those skilled in this class of machines and with the general objects of the present invention in view that changes may be made in the details of structure, the described and illustrated embodiment thereof being intended as an exploitation of its underlying essentials, the features whereof are definitely stated in their true scope in the claims hereof.

I claim:—

1. A machine of the class described comprising a clamping-jack to hold and present a last, jack-feeding mechanism, automatic folding-down and securing mechanisms, and means to automatically stop and start the action of the folding-down and securing mechanisms at predetermined points to allow the jack-feeding mechanism to make one or more active movements between each active movement of the folding-down and securing mechanisms.

2. A machine of the class described comprising a clamping-jack to hold and present a last, jack-feeding mechanism, auxiliary last-presenting mechanism, automatic folding-down and securing mechanisms, and means to automatically stop and start the action of the auxiliary last-presenting, folding-down and securing mechanisms at predetermined points to allow the jack-feeding mechanism to make one or more active movements between each active movement of the presenting, folding-down and securing mechanisms.

3. A machine of the class described comprising intermittent vertically reciprocating last-presenting and last-feeding mechanisms, automatic folding-down and securing mechanisms which vertically oscillate with reference to a fixed point of action and means to control the rise and fall of the presenting and feeding mechanisms with reference to said point of action for each active movement of the folding-down and securing mechanisms.

4. A machine of the class described comprising vertically reciprocating last-feeding mechanism, mechanism to raise the last, automatic folding-down and securing mechanisms which vertically oscillate with reference to their point of action, a gage to govern the rise of the last operating in conjunction therewith and means to vertically reciprocate said gage for each active movement of the folding-down and securing mechanisms.

5. A machine of the class described comprising intermittent vertically reciprocating last-feeding mechanism, mechanism to raise the last, automatic folding-down and securing mechanisms which vertically oscillate with reference to their point of action, a gage to govern the rise of the last with reference to said point of action, means to vertically reciprocate said gage and other means to lock said gage in operative position.

6. A machine of the class described comprising mechanisms for presenting a mounted upper to the action of sewing mechanism, needle and shuttle sewing mechanism having a reciprocating needle-bar, a folding-down tool mounted in the forward end of the needle-bar to oscillate transversely therein and a machine-needle mounted in said folding-down tool to oscillate therewith.

7. A machine of the class described comprising last-presenting mechanism, including upper and lower vertically operated clamping members, a folding-down tool operating in conjunction therewith and means to release and means to raise the upper clamping member for the action of said tool.

8. A machine of the class described comprising last-presenting mechanism, last-feeding mechanism, automatic folding-down and securing mechanisms, comprising a reciprocating needle, a shuttle operating in conjunction therewith, a carrier for said shuttle, and free-revolving spiders (operated by the passing of the needle-thread) mounted on said carrier one or more of whose arms are always in engagement with recesses formed for their reception in the sides of the shuttle, and means to insure the longitudinal position of the shuttle, with reference to said spiders.

9. A machine of the class described comprising last-presenting mechanism, last-feeding mechanism, automatic folding-down mechanism and needle and shuttle sewing mechanism, a swinging thread-guide mounted upon the shuttle-carrier, and means to operate said guide to move the shuttle-thread to the outer side of the carrier on its return movement.

10. A machine of the class described comprising last-presenting mechanism, last-feeding mechanism, automatic folding-down mechanism and needle and shuttle sewing mechanism, a hook to engage with and move the needle-thread from the path of the needle, consisting of a long elastic member and a short member at about right-angles thereto, and means to swing and move said hook, substantially as described.

11. A machine of the class described comprising needle and shuttle sewing-mechanism, a swinging-frame supporting the needle operating mechanism, a cam for swinging said frame and elastic intermediate connections between said frame and cam to ease the initial movements thereof.

12. A machine of the class described comprising needle and shuttle sewing-mechanism, a swinging-frame supporting the needle operating mechanism, means to swing said frame, and a double acting air-cushion cylinder to ease the final movements thereof.

13. A lasting machine, having, in combination, a driving shaft, lasting devices operatively connected to the shaft including means for securing the margin of the upper to the insole, and means operated by the machine to cause said securing means to become inoperative during the continued operation of the driving shaft.

14. A lasting machine, having, in combination, a driving shaft, lasting devices operatively connected to the shaft including means for securing the margin of the upper to the insole, and means operated by the machine to cause said securing means to become inoperative during the continued operation of the driving shaft and to again throw said securing means into operation after the desired period of inaction.

15. A lasting machine, having, in combination, a driving shaft, lasting devices operatively connected to the shaft including means for overlaying the margin of the upper on the insole, and automatic means to cause said overlaying means to become inoperative during the continued operation of the driving shaft.

16. A lasting machine, having, in combination, a driving shaft, lasting devices operatively connected to the shaft including means for overlaying the margin of the upper on the insole, and means operated by the machine to cause said overlaying means to become inoperative during the continued operation of the driving shaft and to again throw said overlaying means into operation after the desired period of inaction.

17. A lasting machine, having, in combination, a driving shaft, lasting devices, suitable connections between the shaft and lasting devices for operating said devices once for each rotation of the shaft, and means brought into operation by the rotation of the driving shaft for stopping the operation of said device while the shaft continues to rotate.

18. A lasting machine, having, in combination, a driving shaft, lasting devices, suitable connections between the shaft and lasting devices for operating said devices once for each rotation of the shaft, and means for stopping the operation of said devices for a predetermined number of revolutions of the shaft and while the shaft continues to rotate.

19. A lasting machine, having, in combination, a driving shaft, lasting devices, suitable connections between the shaft and lasting devices for operating said devices once for each rotation of the shaft, and means operated by the machine for stopping the operation of said devices while the shaft continues to rotate.

20. A lasting machine, having, in combination, shoe supporting means, step-by-step shoe feeding means, mechanism for folding down the margin of the upper and securing it to the insole normally operating once for each feed movement, and means for stopping the operation of said mechanism during selected feed movements.

21. A lasting machine, having, in combination, a shoe support, lasting devices, means for imparting a relative step-by-step movement to said support and devices to transfer the point of operation of the devices around the shoe, and means to cause said devices to become inoperative during a portion of the steps of said relative movement.

22. A lasting machine, having, in combination, a shoe support, lasting devices including means for securing the margin of the upper to the insole, means for imparting a relative step-by-step movement to said support and devices to transfer the point of operation of the devices around the shoe, and means to cause said securing means to become inoperative during a portion of the steps of said relative movement.

23. A lasting machine, having, in combination, a shoe support, lasting devices including means for securing the margin of the upper to the insole, means for imparting a relative step-by-step movement to said support and devices to transfer the point of operation of the devices around the shoe, and automatic means to cause said securing means to become inoperative during a portion of the steps of said relative movement.

24. A lasting machine, having, in combination, a shoe support, lasting devices including means for securing the margin of the upper to the insole, means for imparting a relative step-by-step movement to said support and devices to transfer the point of operation of said devices around the shoe, and means for stopping the operation of said securing means during a predetermined number of said steps.

25. A lasting machine, having, in combination, a jack, lasting devices including means for securing the margin of the upper to the insole, means for moving the jack past the lasting devices by a continuous step-by-step feed, and means controlled by the machine for causing the upper securing means to operate concurrently with the feed movement for a time, then to become inoperative for a time and then to again operate concurrently with the feed movement.

26. A lasting machine, having, in combination, a jack, lasting devices including means for securing the margin of the upper to the insole, means for moving the jack past the lasting devices by a continuous step-by-step feed, and means controlled by the machine for causing the upper securing means to operate concurrently with the feed movement, and automatically operating mechanism, intermediate the jack feeding means and the lasting devices, for rendering the securing means inoperative at predetermined times during the continued operation of the feeding means.

27. A lasting machine, having, in combination, a jack, lasting devices including means for securing the margin of the upper to the insole, means for moving the jack past the lasting devices by a continuous step-by-step feed, means controlled by the machine for causing the upper securing means to operate concurrently with the feed movement, a cam intermediate the jack feeding means and the lasting devices, and mechanism operated by said cam for rendering the securing means inoperative while the jack feeding means continues in operation.

28. A lasting machine, having, in combination, a jack, step-by-step jack feeding means, lasting devices including means for securing the margin of the upper to the insole connected to be operated concurrently with the feed movements of the jack, and means for rendering the securing means inoperative during a predetermined number of the feed movements.

29. A lasting machine, having, in combination, a shoe support, lasting devices, means for imparting a relative step-by-step movement to said support and devices to transfer the point of operation of the devices around the shoe, and means automatically to stop and start the action of the lasting devices at predetermined points to allow one or more relative transferring movements between each active movement of the lasting devices.

30. A lasting machine, having, in combination, lasting devices, a vertically movable jack to present a shoe to said devices, jack elevating mechanism, means for imparting a relative step-by-step movement to said support and devices to transfer the point of operation of the devices around the shoe, and means automatically to stop and start the action of the jack elevating mechanism and the lasting devices at predetermined points to allow one or more relative transferring movements between each active movement of the lasting devices.

31. A lasting machine, having, in combination, lasting devices including means for securing the margin of the upper to the insole, a vertically movable jack, jack elevating mechanism, and means for simultaneously elevating the jack and starting the operation of the upper securing means.

32. A lasting machine, having, in combination, lasting devices including means for securing the margin of the upper to the insole, a vertically movable jack, jack elevating mechanism, jack feeding means, means for rendering the upper securing means inoperative during a succession of feed movements, and means for retaining the jack in a lowered position while the securing means are inoperative.

33. A lasting machine, having, in combination, lasting devices including means for securing the margin of the upper to the insole, a vertically movable jack, jack elevating mechanism, jack feeding means, means for rendering the upper securing means inoperative during a succession of feed movements, means for retaining the jack in a lowered position while the securing means are inoperative, and means for concurrently raising the jack and rendering the upper securing means operative.

34. A lasting machine, having, in combination, lasting devices, a swinging frame supporting a part of said devices, an actuator to swing the frame during the lasting operation, and means to ease the initial and final movements of said frame.

35. A lasting machine, having, in combination, lasting devices, a swinging frame supporting a part of said devices, and means for yieldingly actuating said frame at the start of its swinging movement during the lasting operation.

36. A lasting machine, having, in combination, lasting devices, a swinging frame supporting a part of said devices, an actuator to swing the frame during the lasting operation, and means for cushioning the return swing of the frame.

37. A lasting machine, having, in combination, lasting devices including means for securing the margin of the upper to the insole, a sole gage, means for moving the gage relatively to the securing means, and mechanism for locking the gage in a predetermined position relative to the securing means to insure the proper operation of said means on the shoe.

38. A lasting machine, having, in combination, lasting devices including means for securing the margin of the upper to the insole, a sole gage, means for moving the gage relatively to the securing means, and mechanism for locking the gage in a predetermined position relative to the securing means to insure the proper operation of said means on the shoe, and means for thereafter unlocking the gage and returning it to its initial position.

39. A lasting machine, having, in combination, lasting devices including means for securing the margin of the upper to the insole, a sole gage, means for positively moving the gage downward to a predetermined position relative to the securing means, a catch for locking the gage down, means for thereafter releasing the catch, and a spring for moving the gage away from the shoe.

40. A lasting machine, having, in combination, lasting devices including means for securing the margin of the upper to the insole, a sole gage, vertically movable to determine the position of the shoe relative to the securing means, means for moving the gage downward, means for locking the gage down, and automatic means for unlocking the gage and moving it upward to its initial position.

41. A lasting machine, having, in combination, pincers for seizing the margin of the upper, a knife having a blade arranged to slit the margin of the upper and produce separate sections, a tool for folding down said sections on the insole, means for securing said sections to the insole, and mechanism for operating said devices in proper sequence.

42. A lasting machine, having, in combination, pincers for seizing the margin of the upper, a knife having a blade shaped to trim the margin of the upper and simultaneously slit the trimmed margin to produce separate sections, a tool for folding down said sections on the insole, means for securing said sections to the insole, and mechanism for operating said devices in proper sequence.

43. A lasting machine, having, in combination, lasting devices including stitch-forming mechanism having a reciprocating needle-bar to secure the margin of the upper to the insole, and a tool mounted in the forward end of the needle-bar for folding down the margin of the upper on the insole before the stitch is set.

44. A lasting machine, having, in combination, lasting devices, a jack, means to raise the jack to present the shoe to the lasting devices, a sole gage, and means to move said gage down as the jack moves up whereby the shoe is clamped between the jack and gage for the action of the lasting devices.

45. A lasting machine, having, in combination, lasting devices, a jack, means to raise the jack and the shoe thereon, a sole gage to govern the rise of the jack, means to move said gage to a position to insure the proper operation of the lasting devices on the shoe, and means to lock it in position prior to the completion of the rise of the jack.

JOSEPH E. CRISP.

Witnesses:
FRANK G. PARKER,
WILLIAM B. HEWITT.

Copies of this patent may be obtained for five cents each, by addressing the "Commissioner of Patents, Washington, D. C."

It is hereby certified that in Letters Patent No. 1,018,965, granted February 27, 1912, upon the application of Joseph E. Crisp, of Somerville, Massachusetts, for an improvement in "Lasting-Machines," errors appear in the printed specification requiring correction as follows: Page 2, line 44, for the word "side" read *end;* page 5, line 52, before the word "curving" insert the word *by;* page 6, line 105, before the word "suitable" insert the article *a;* page 7, line 23, for the word "looper" read *needle;* same page, line 111, for the word "needle" read *shuttle,* and same page, line 114, for the word "shuttle" read *needle;* and that the said Letters Patent should be read with these corrections therein that the same may conform to the record of the case in the Patent Office.

Signed and sealed this 2nd day of April, A. D., 1912.

[SEAL.]                C. C. BILLINGS,

*Acting Commissioner of Patents.*